United States Patent [19]

Malott

[11] Patent Number: 5,669,430

[45] Date of Patent: Sep. 23, 1997

[54] LOW PROFILE VEHICLE AWNING WITH IMPROVED LATCH

[75] Inventor: Dale G. Malott, Middlebury, Ind.

[73] Assignee: White Consolidated Industries, Inc., Cleveland, Ohio

[21] Appl. No.: 529,146

[22] Filed: Sep. 15, 1995

[51] Int. Cl.[6] .................................................. E04F 10/06
[52] U.S. Cl. .................................................. 160/67; 292/175
[58] Field of Search .................................. 160/67, 66, 69, 160/71, 78, 80, 22; 135/88.1, 88.11, 88.12; 292/175

[56] References Cited

U.S. PATENT DOCUMENTS

| | | |
|---|---|---|
| 3,003,202 | 10/1961 | Mendelsohn ............... 292/175 X |
| 3,324,869 | 6/1967 | Duda . |
| 3,501,188 | 3/1970 | Korkos ....................... 292/175 |
| 3,741,274 | 6/1973 | Youngblood . |
| 3,870,096 | 3/1975 | Horrell . |
| 4,117,876 | 10/1978 | Bennett . |
| 4,164,972 | 8/1979 | Bennett . |
| 4,195,877 | 4/1980 | Duda . |
| 4,576,192 | 3/1986 | Duda . |
| 4,719,954 | 1/1988 | Curtis et al. . |
| 4,759,396 | 7/1988 | Quinn . |
| 4,770,223 | 9/1988 | Ouellette . |
| 4,819,706 | 4/1989 | Quinn . |
| 4,819,707 | 4/1989 | Watson . |
| 5,172,743 | 12/1992 | Wallace et al. . |
| 5,472,007 | 12/1995 | Malott ....................... 160/66 X |

*Primary Examiner*—David M. Purol
*Attorney, Agent, or Firm*—Pearne, Gordon, McCoy & Granger LLP

[57] ABSTRACT

An awning assembly for a recreational vehicle has a pair of pivoting support arms supporting a roller. Rafters are pivotably and slidably mounted to the support arms and maintain the awning in an extended position. In a stowed position, the rafters and support arms are parallel and extend vertically along a wall of the vehicle. The support arms have bent upper ends so that the roller is positioned above a top edge of the wall to provide a low profile in the stowed position. Existing support arms can be equipped with bent extension adapters. A sliding latch is mounted on the support arm and engages the rafter when the awning is stowed. The latch is spring biased to a latching position and has a bolt that automatically retracts similar to a door bolt.

29 Claims, 7 Drawing Sheets

LOW PROFILE VEHICLE AWNING WITH IMPROVED LATCH

BACKGROUND OF THE INVENTION

1. Field of the Invention

This invention relates generally to the field of awnings and specifically to retractable awnings for vehicles.

2. Description of the Related Art

Vehicles, such as recreational vehicles and vending trucks, are commonly provided with stowable or retractable awning assemblies. The awning is generally rolled on a roller, which is supported on a pair of support arms pivotably mounted on a wall of the vehicle. Alternatively, the roller can be mounted to the wall and the support arms support a lead rail attached to the leading edge of the awning. The awning is maintained in an extended position by rafters extending between the wall and upper ends of the support arms. In a stowed position, the rafter arms are stowed parallel with the support arms, either nesting therein or on one side thereof. A strap or latch can be used to maintain the rafters and arms in the stowed position, as shown in U.S. Pat. Nos. 4,117,876 to Bennett, 4,819,706 to Quinn, 4,819,707 to Watson, 4,719,954 to Curtis, 4,759,396 to Quinn, and 5,172,743 to Wallace, all incorporated herein by reference.

In the stowed position, the awning assembly extends outwardly from the wall at least the thickness of the roller and awning rolled thereon. This increases the effective width of the vehicle. However, it is desirable to maintain the total vehicle width within certain standards while maximizing interior space in the vehicle. In some installations, the awning is located on the roof of the vehicle in the stowed position, as shown in U.S. Pat. Nos. 3,741,274 to Youngblood, Jr., 3,870,096 to Horrell, 4,164,972 to Bennett, and 4,770,223 to Ouellette, incorporated herein by reference. Other assemblies have curved arms adapted for installation on vehicles with rounded sides, as shown in U.S. Pat. Nos. 3,324,869; 4,195,877; and 4,576,192 to Duda, incorporated herein by reference.

SUMMARY OF THE INVENTION

The present invention provides an awning assembly for installation on a wall defining a generally vertical plane. The awning assembly includes an awning having a first edge adapted for being attached to the wall and a second edge opposite the first edge. An elongated roller has the second edge attached thereto. A pair of support arms are adapted for being pivotably mounted to the wall and rotatably support ends of the roller. The roller is movable between a stowed position adjacent the wall and an extended position spaced from the wall. The support arms each have an upper end extending past an upper edge of the wall in the stowed position. The upper end is bent so that the roller intersects the plane defined by the wall in the stowed position.

A roller mounting hole is disposed at the upper end of each support arm and is adapted for mounting an axle of the roller therein. The mounting hole is located so that the axle is in the plane of the wall when the roller is in the stowed position. The awning unrolls from a side of the roller disposed outboard of the wall. The support arm includes an angled extension mounted to a generally vertical main support arm. The extension includes legs inserted in an end of the main support arm, one of said legs receiving a fastener through a wall of the main support arm. The fastener is disposed below a second roller mounting hole in the main support arm.

The invention also includes a latch assembly for an awning assembly having a rafter disposable between the support arm and the wall and adapted for maintaining the support arm spaced from the wall so as to maintain the awning in an extended position and being generally parallel with and adjacent the support arm in a stowed position. The latch assembly includes a bolt adapted to be slidably mounted to one of the support arm and the rafter and adapted to be moved between a latching position engaging the other of the support arm and the rafter and a retracted position.

Means are provided for biasing the bolt toward the latching position. A handle is adapted for retracting the bolt. The biasing means includes a spring. A latch bracket is adapted for being mounted to the one of the support arm and rafter so as to retain the bolt thereon. The latch bracket includes a flange, and said spring is disposed between the flange and the bolt. The bolt includes a nose adapted for projecting from the one of the support arm and rafter and engaging the other of the support arm and rafter, and the spring is biased against the nose. The latch assembly includes a nose adapted for projecting from the one of the support arm and rafter and engaging the other of the support arm and rafter, and the nose has a sloped surface adapted for retracting the bolt when the nose engages the other of the support arm and rafter. The bolt is adapted for projecting laterally from the one of the support arm and rafter.

The rafter is pivotably and slidably mounted to the support arm and adapted for being pivotably mounted to the wall. The rafter is mounted to a side of the support arm so that the rafter and support arm in the stowed position define a plane generally parallel with the wall. The support arm is spaced from the wall in the stowed position and a pivot support has an end of the rafter pivotably attached thereto. The pivot support is mounted at the wall and spaces the rafter from the wall substantially the same distance as the support arm is spaced from the wall.

DESCRIPTION OF THE PREFERRED EMBODIMENTS

Figure 1:
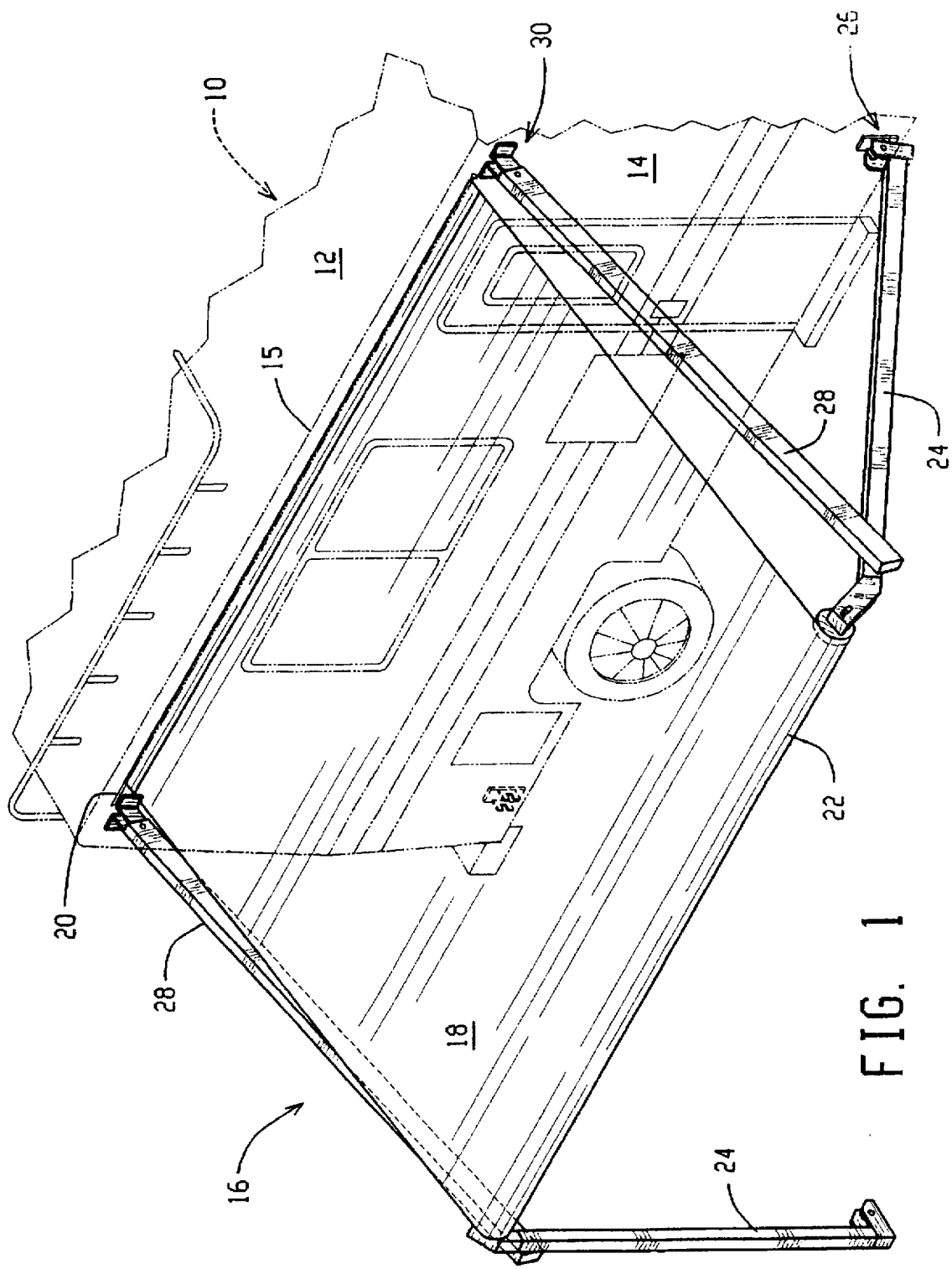
FIG. 1 shows an erected awning assembly and vehicle according to the invention.

Referring to FIG. 1, a vehicle 10 has a roof 12 and a relatively flat, vertical wall 14 defining a relatively vertical plane. The roof 12 meets the wall 14 at an upper edge 15 of the wall to form a square or slightly rounded corner. An awning assembly 16 is mounted on the wall 14 and includes an awning 18. The awning 18 has a trailing edge attached at the wall 14, preferably in an awning rail 20 mounted on the wall. A leading edge of the awning 18 is attached to a roller 22 and adapted for being rolled thereon. The roller 22 is rotatably mounted on support arms 24 that are pivotably mounted to the wall 14 in support arm bracket assemblies 26. The bracket assemblies 26 permit removal of the support arms 24 from the wall so that the arms can be placed on the ground. The support arms support the roller 22 and, thus, the leading edge of the awning 18.

Rafters 28 each have an inboard end pivotably mounted to rafter brackets 30 near the top of the wall 14. An outboard end of each rafter 28 is attached to a corresponding one of the support arms 24. In some installations, the rafters are attached to the roller or, when the roller is stationary and mounted at the wall, the rafters are mounted to a lead rail or another element at the leading edge of the awning. In the embodiment shown, the rafter is slidably mounted on a face of the support arm 24. FIG. 1 shows the awning 18 in an extended position unrolled from the roller. In the extended position, the rafters 28 extend between the leading and trailing edges of the awning 18 to maintain the awning in the extended position. The support arms 24 and rafters 28 define support elements mounted to the wall 14 and adapted for supporting the awning 18 in the extended position and being stowed near the wall in the stowed position.

Figure 2:
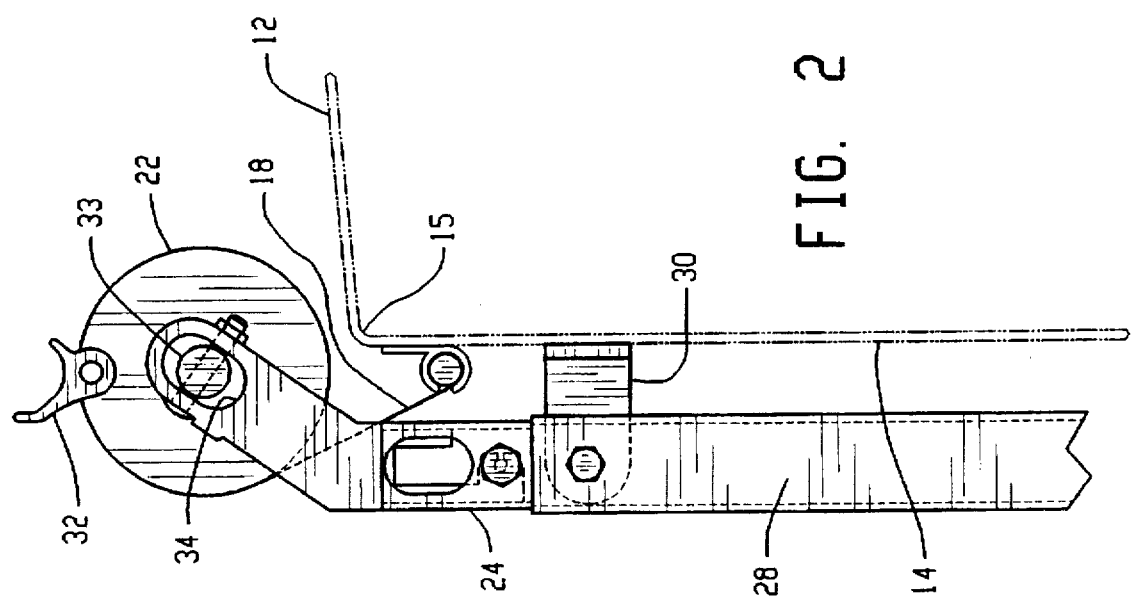
FIG. 2 shows an end view of a top part of the vehicle and awning assembly in a partially extended position.

Referring to FIG. 2, the awning assembly is shown in a stowed position. The rafter 28 and support arm 24 are parallel and generally vertical along the wall 14. The brackets 30, 26 (FIG. 1) maintain the support arm 24 and rafter 28 a desired distance from the wall to provide clearance therefrom. The roller 22 is spring loaded so as to bias the roller toward the stowed position with the awning 18 rolled thereon. The roller has an axle 33 that is mounted in a roller mounting hole 34. The spring loading of the roller 22 tends to cause rotation of the roller on the axle 33. A roller lock 32 is provided to prevent rotation of the roller 22 in a selected one of two directions.

An upper end of the support arm 24 is bent inwardly toward the wall 14 so that, in the stowed position, the roller intersects or breaks the plane defined by the wall. "Bent" means angled, curved, or otherwise configured to position the roller as described using one or more pieces. That is, the roller is positioned partly, but not entirely, over the roof 12 so that the roller projects no further outboard than the rafters 28 and support arms 28 in the stowed position. Preferably, the assembly has no parts extending more that 5 cm from the wall 14. As shown, the axle 33 and roller mounting hole 34 are located in the plane of the wall 14 and above the upper edge 15 of the wall. The awning 18 is rolled on the roller 22 so that the awning unrolls from the bottom of the roller. That is, the awning 18 extends outwardly from the wall and is unrolled from a side of the roller disposed outboard of the wall 14. Thus, the spring loading of the roller 22 biases the assembly to the stowed position shown.

Figure 3:
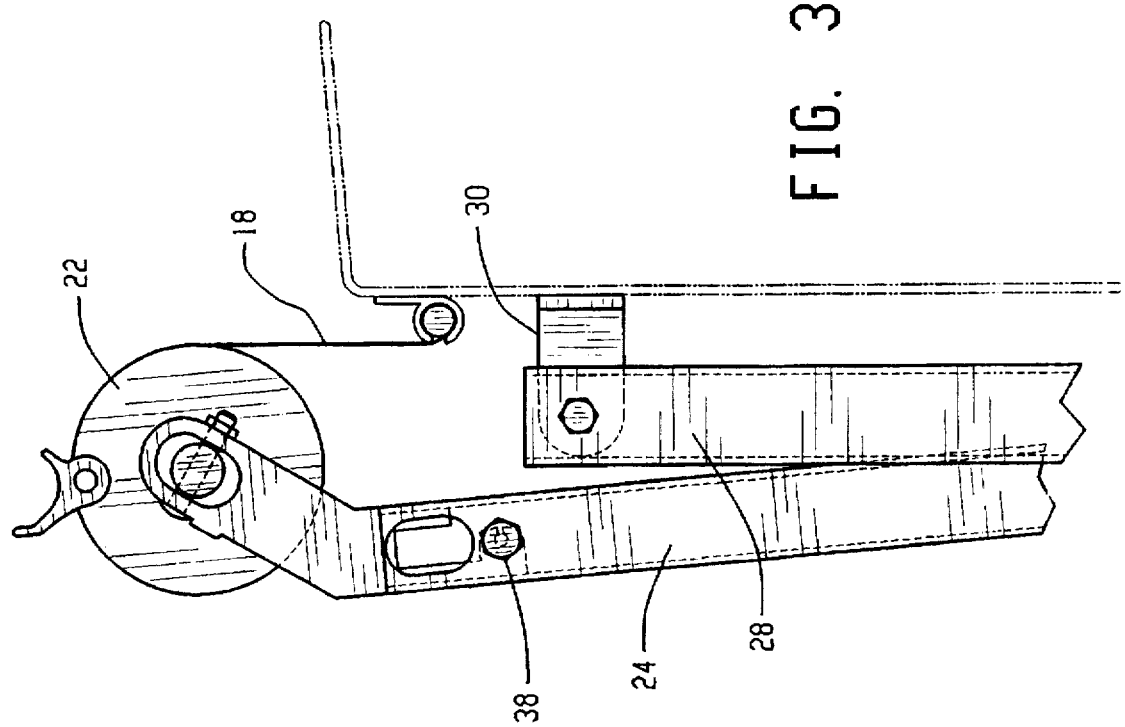
FIG. 3 shows an end view of an alternative embodiment of the awning assembly in a partially extended position.

Referring to FIG. 3, the awning assembly is identical to that shown in FIG. 2 except that the awning 18 is rolled oppositely on the roller 22. That is, the awning unrolls from the top and inboard side of the roller. Thus, the spring loading of the roller 22 biases the assembly to the position shown. To fully stow the awning assembly, the support arms 24 are pushed inwardly against the force of the spring loading until the support arms are parallel with the rafters 28. Because the roller lock 32 will normally be in a "roll up" position, the lock is switched to a "roll down" position to complete stowing. Then, the lock can be switched back to the "roll up" position.

Figure 4C:
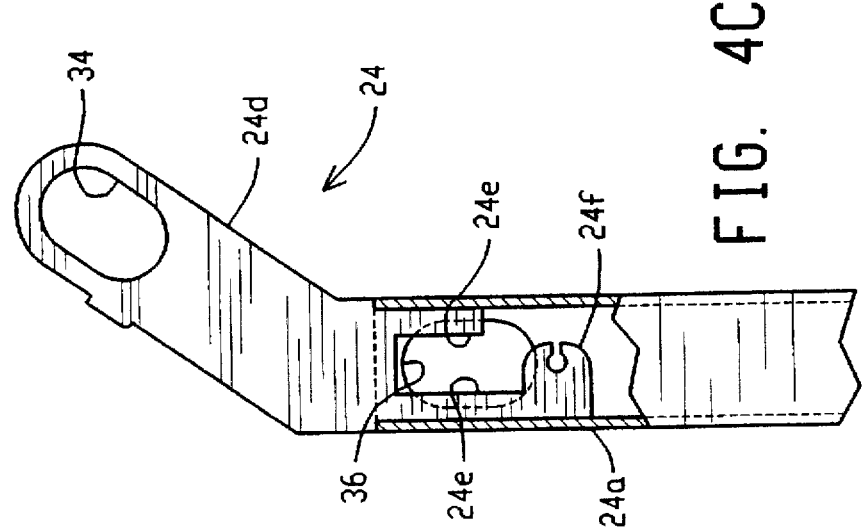
FIGS. 4A–4C show different embodiments of upper ends of support arms.
Figure 4B:
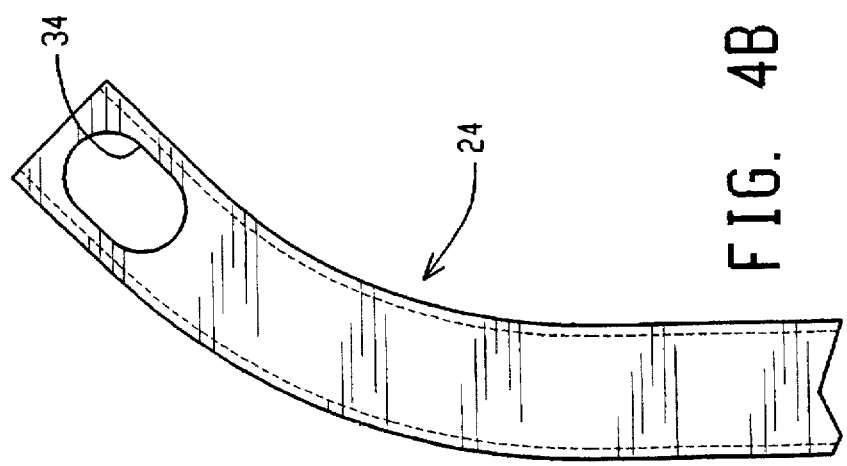
Figure 4A:
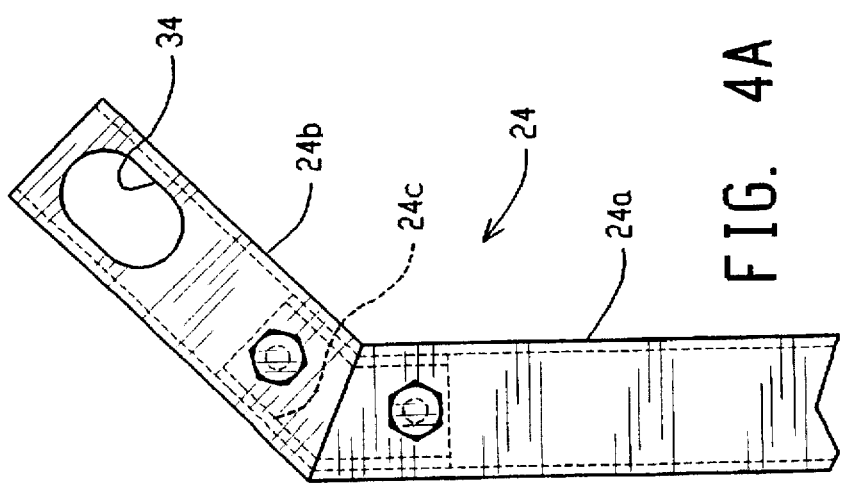

Referring to FIG. 4A, the upper end of the support arm 24 includes a main support arm 24a provided with an upper extension 24b connected by an insert 24c and a suitable fastener, such as nuts and bolts. The insert 24c is angled to provide the desired bent configuration at the upper end of the support arm 24. Mating edges of the main support arm 24a and extension 24b are mitered to provide a smooth exterior surface. The roller mounting hole 34 is provided near the top of the extension 34.

As shown FIG. 4B, the upper end of the support arm 24 can be a single curved or angled piece. The arm is extruded or otherwise manufactured or shaped to provide the desired bent configuration. The roller mounting hole 34 is provided near the top of the support arm 24.

FIG. 4C shows another example of a multiple piece upper end of the support arm 24. The support arm includes an extension adapter 24d provided with legs 24e. The legs 24e are adapted to fit in the end of the hollow support arm 24a provided with many existing awning assemblies. One of the legs 24e is provided with a female thread 24f adapted to receive a screw 38 (FIG. 3) installed through a wall of the existing support arm 24a. The upper end of the existing main support arm 24a will generally have an existing roller mounting hole 36. The female thread 24f is located below the existing mounting hole 36 to provide a solid structure through which to insert the screw. Alternatively, an insert can be provided in the existing mounting hole 36 for mounting the screw. The adapter 24d is angled or curved to provide the desired bent configuration. The roller mounting hole 34 is located near the top of the adapter 24d.

Figure 5:
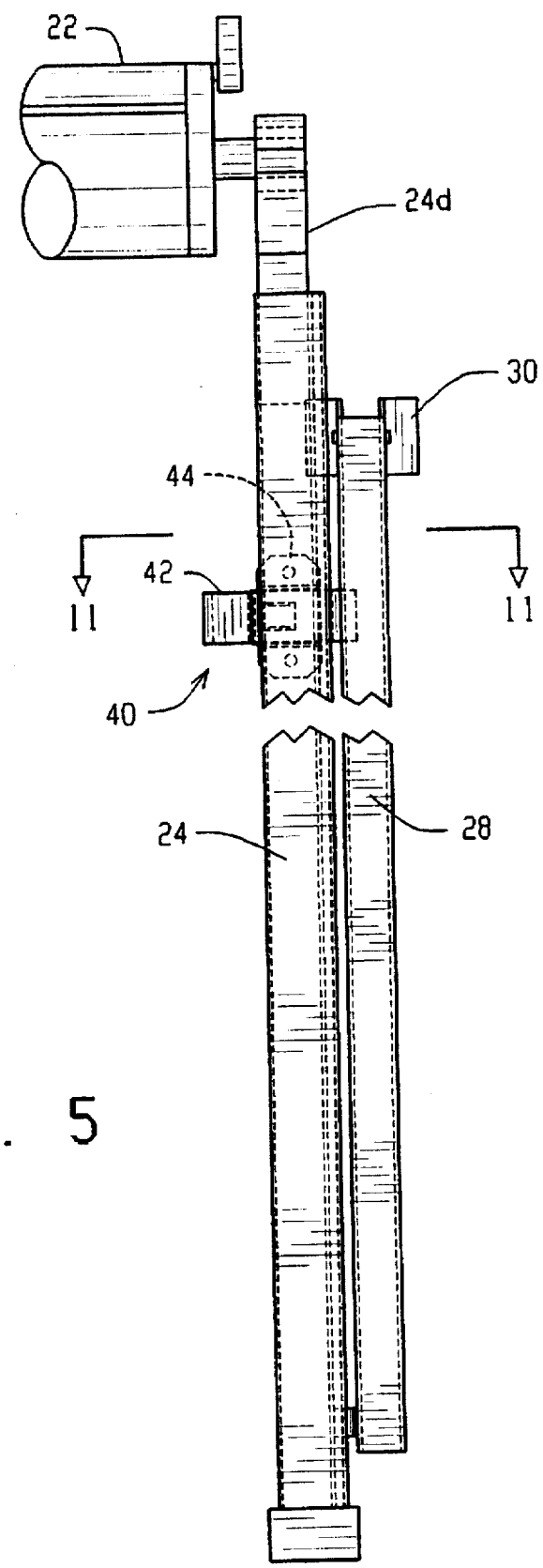
FIG. 5 shows a front view of an end of the awning assembly.
Figure 6:
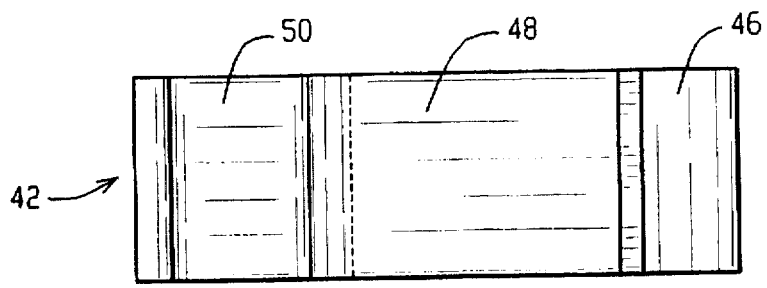
FIG. 6 shows a front view of a bolt of a latch assembly.
Figure 7:
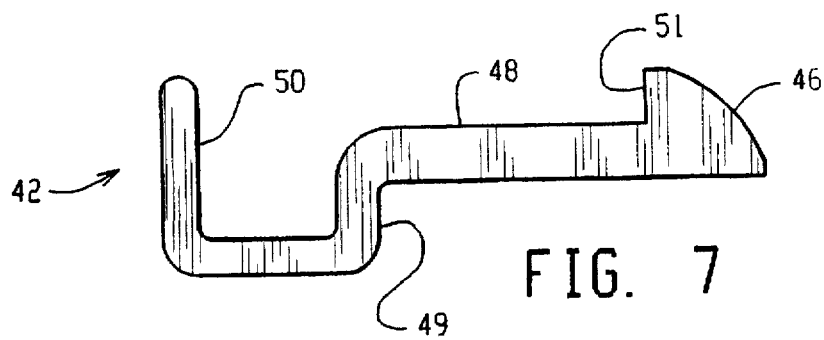
FIG. 7 shows a top view of the bolt.
Figure 8:
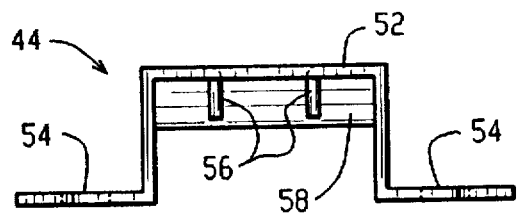
FIG. 8 shows a top view of a mounting bracket of the latch assembly.
Figure 9:
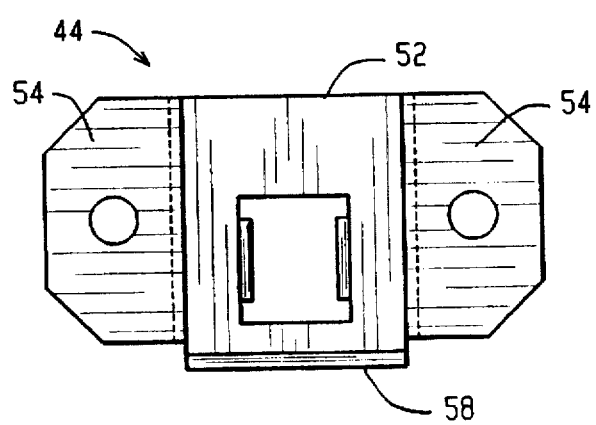
FIG. 9 shows a front view of the bracket.
Figure 10:
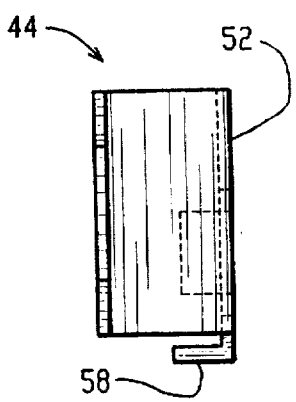
FIG. 10 shows a side view of the bracket.

Referring to FIG. 5, a latch assembly 40 is mounted on one or both of the support arms 24. Alternatively, the latch assembly can be mounted to one or both rafters 28. The latch assembly includes a bolt 42 mounted to the support arm 24 by a latch bracket 44. FIGS. 6 and 7 show the bolt 42, which includes a nose 46, a bolt body 48, a slide stop 49, a handle 50, and a spring stop 51. FIGS. 8, 9, and 10 show the latch bracket 44, which includes a bracket body 52, a pair of mounting flanges 54, a pair of guides 56, and a spring stop 58.

Figure 11:
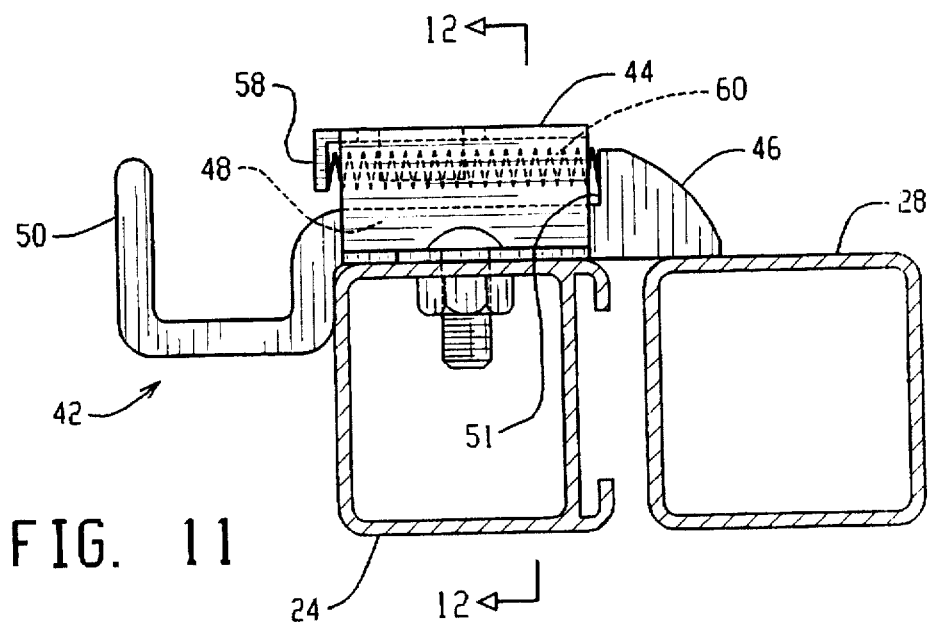
FIG. 11 shows a top view of the latch assembly installed on a support arm.
Figure 12:
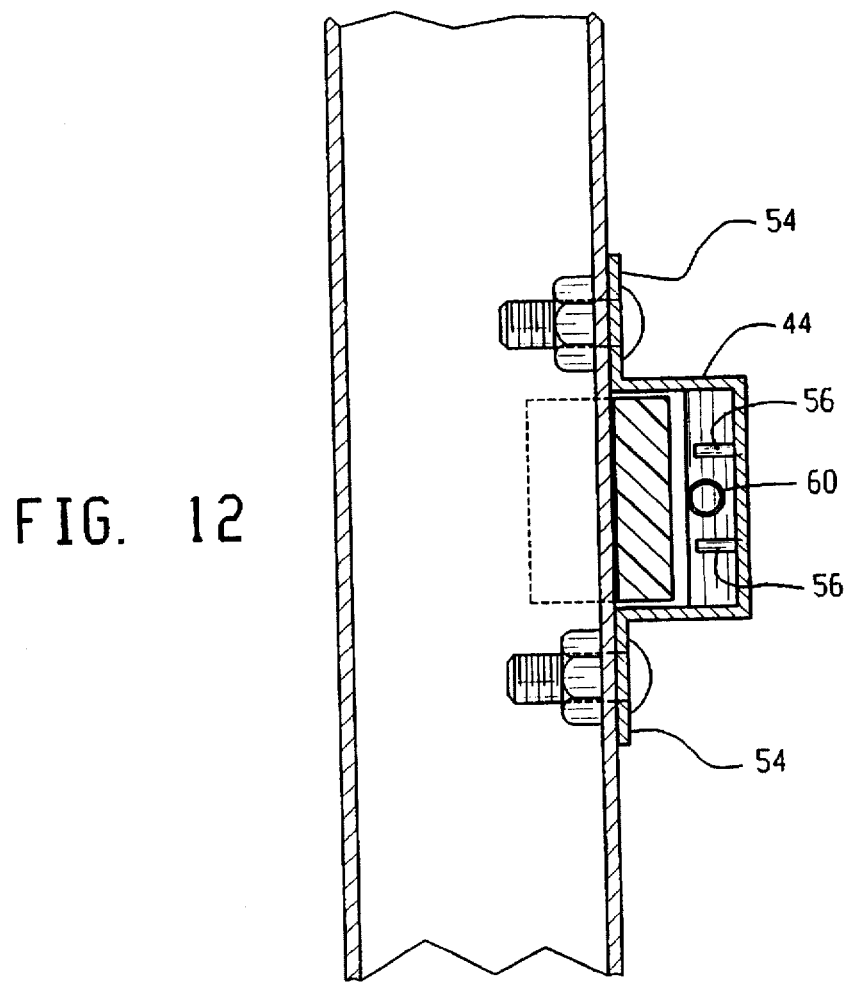
FIG. 12 shows a side view of the latch assembly.

As shown in FIGS. 11 and 12, the bolt 42 is mounted so that the bolt body 48 is against a wall of the support arm 24 and the nose 46 projects toward the rafter 28. The latch bracket 44 is located over the bolt 42 and secured to the support arm 24 by suitable fasteners at the mounting flanges 54. A biasing device, such as a compression spring 60 disposed between the spring stop 51 of the nose 46 and the spring stop 58 of the bracket 44, biases the bolt toward the rafter 28. The slide stop 49 limits travel of the bolt 42. The guides 56 prevent buckling of the spring 60 and retain the bolt adjacent the support arm 24.

Figure 13:
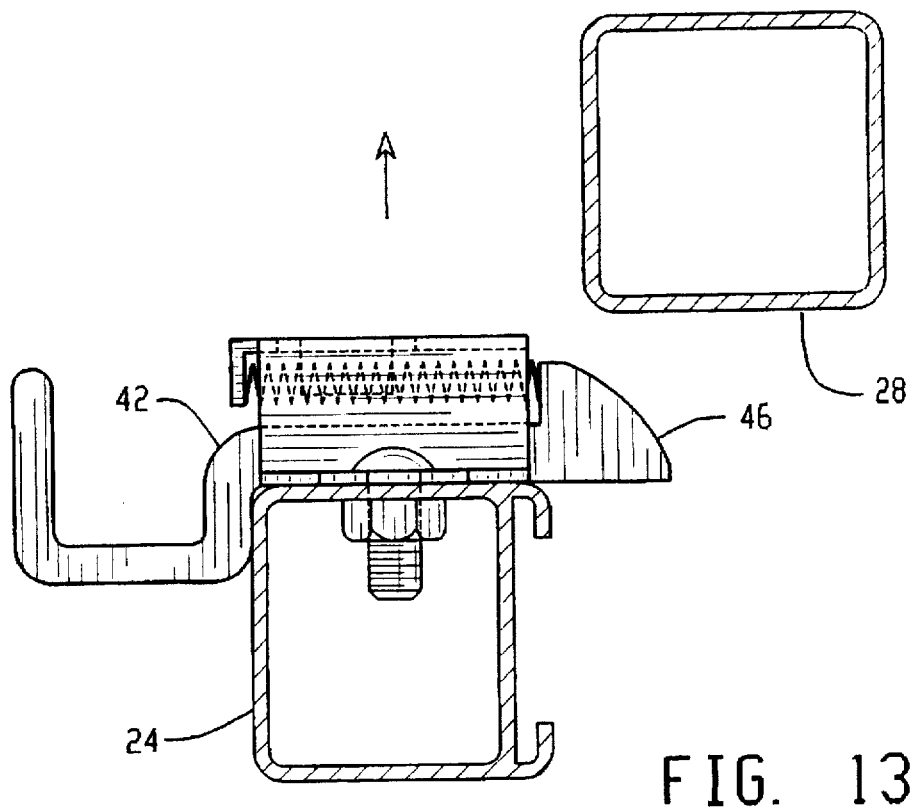
FIGS. 13 and 14 show top views of operation of the latch assembly.
Figure 14:
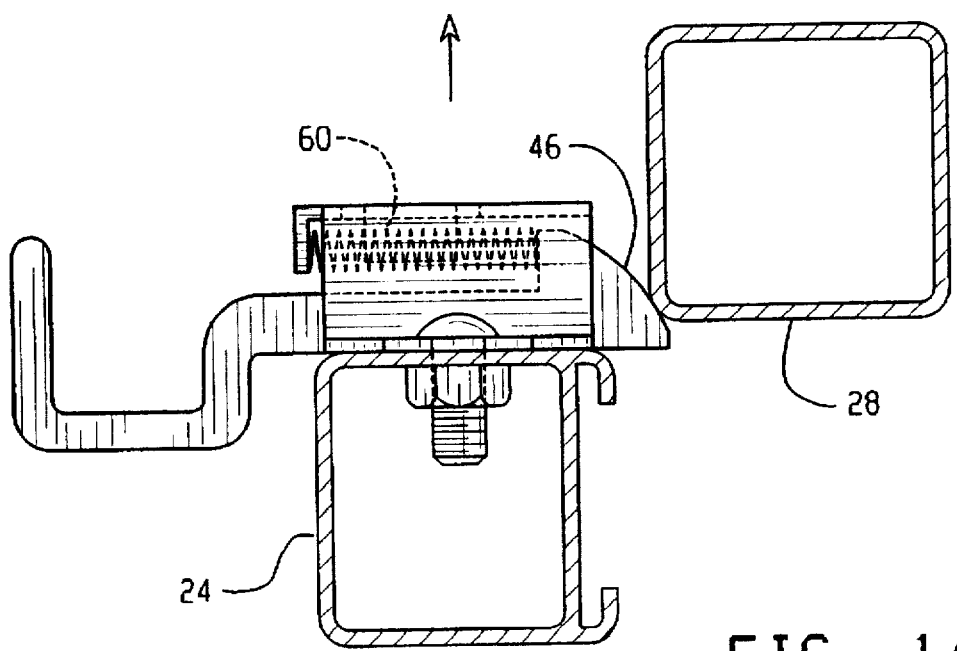

As shown in FIG. 11, the nose 46 engages the rafter 28 in the stowed position to maintain the rafter and support arm 24 substantially parallel. The handle 50 is manually operated to slide the bolt 42 away from the rafter 28 so that the nose 46 clears the rafter. When the awning is stowed, the support arm 24 is moved toward the rafter 28, as shown in FIGS. 13 and 14. The bolt 42 is biased toward the rafter 28 so that the nose 46 engages the rafter. The nose 46 is sloped or curved so that engagement of the nose with the rafter retracts the bolt 42. When the nose 46 passes the rafter 28, the spring 60 causes the bolt to extend outwardly and latch with the rafter 28, as shown in FIG. 11. Thus, operation of the latch assembly is similar to a door bolt and provides simple, automatic latching of the rafter 28 and support arm 24 during stowing of the awning. For extension of the awning, simple, manual unlatching is performed.

The present disclosure describes several embodiments of the invention, however, the invention is not limited to these embodiments. Other variations are contemplated to be within the spirit and scope of the invention and appended claims.

What is claimed is:

1. An awning assembly installed on a wall, said wall defining a generally vertical plane, said assembly comprising:

an awning having a first edge attached to the wall and a second edge opposite the first edge;

an elongated roller having the second edge of the awning attached thereto; and a pair of support arms pivotably mounted to the wall and rotatably supporting ends of the roller, said roller being movable between a stowed position adjacent the wall and an extended position spaced from the wall, said support arms each having an upper end extending past an upper edge of the wall in the stowed position, said upper end being bent so that the roller intersects the plane defined by the wall in the stowed position wherein the awning is rolled on the roller so that a line of contact from which the awning unrolls from the roller does not pass through the plane defined by the wall when the awning is retracted.

2. An awning assembly according to claim 1 further comprising a roller mounting hole disposed at the upper end of each support arm and adapted for mounting an axle of the roller therein, said mounting hole being located so that the axle is in the plane of the wall when the roller is in the stowed position.

3. An awning assembly according to claim 1 wherein the support arm includes an angled extension mounted to a generally vertical main support arm.

4. An awning assembly according to claim 3 wherein the extension includes legs inserted in an end of the main support arm, one of said legs receiving a fastener through a wall of the main support arm.

5. An awning assembly according to claim 4 wherein the fastener is disposed below a second roller mounting hole in the main support arm.

6. An awning assembly according to claim 1 wherein the upper end of the support arm is curved.

7. An awning assembly for installation on a wall, said wall defining a generally vertical plane, said assembly comprising:

an awning having a first edge adapted for being attached to the wall and a second edge opposite the first edge;

an elongated roller having the second edge attached thereto;

an axle on which the roller is rotatably mounted;

a pair of support arms adapted for being pivotably mounted to the wall, each having a first roller mounting hole disposed at the upper end of each support arm and adapted for mounting the axle of the roller therein;

an angled arm extension having legs inserted in an end of each support arm, one of said legs receiving a fastener through a wall of the support arm, each extension having a second roller mounting hole supporting respective ends of the axle, said roller being movable with the support arms and extensions between a stowed position adjacent the wall and an extended position spaced from the wall, said extensions each having an upper end adapted to extend above an upper edge of the wall in the stowed position; and said second mounting holes being located so that the axle is adapted to be in the plane of the wall when the roller is in the stowed position.

8. A latch and awning assembly having an awning with a leading edge and a trailing edge, said trailing edge being attachable at a wall; a support arm adapted for supporting the leading edge of the awning; and a rafter disposable between the support arm and the wall and adapted for maintaining the support arm spaced from the wall so as to maintain the awning in an extended position and being generally parallel with and adjacent the support arm in a non-nesting stowed position, said latch comprising:

a laterally movable bolt slidably mounted to one of the support arm and the rafter and adapted to be moved laterally between a latching position engaging the other of the support arm and the rafter and a retracted position.

9. A latch and awning assembly according to claim 8 further comprising means for biasing the bolt toward the latching position.

10. A latch and awning assembly according to claim 9 further comprising a handle adapted for retracting the bolt.

11. A latch and awning assembly according to claim 9 wherein the biasing means comprises a spring.

12. A latch and awning assembly according to claim 11 further comprising a latch bracket mounted to the one of the support arm and rafter so as to retain the bolt thereon, said latch bracket including a stop, wherein said spring is disposed between the stop and the bolt.

13. A latch and awning assembly according to claim 12 wherein the bolt includes a nose adapted for projecting from the one of the support arm and rafter and engaging the other of the support arm and rafter, wherein the spring is biased against the nose.

14. A latch and awning assembly according to claim 8 wherein the latch includes a nose adapted for projecting from the one of the support arm and rafter and engaging the other of the support arm and rafter, wherein the nose has a sloped surface adapted for retracting the bolt when the nose engages the other of the support arm and rafter.

15. A latch and awning assembly according to claim 14 further comprising means for biasing the bolt toward the latching position.

16. A latch and awning assembly according to claim 14 further comprising a handle adapted for retracting the bolt.

17. An awning assembly comprising:

an awning having a leading edge and a trailing edge, said trailing edge being attachable at a wall;

a support arm adapted for supporting the leading edge of the awning;

a rafter disposable between the support arm and the wall and adapted for maintaining the support arm spaced from the wall so as to maintain the awning in an extended position and being generally parallel with, not nested in, and adjacent the support arm in a stowed position; and a latch assembly slidably mounted on one of the support arm and the rafter and having a nose projecting laterally from one of the support arm and the rafter wherein the nose has a sloped surface adapted for engaging the other of the support arm and the rafter and causing the latch to slide to a retracted position the latch having a latching position engaging the other of the support arm and the rafter so as to retain the support arm and rafter in a generally parallel position.

18. An awning assembly according to claim 17 further comprising means for biasing the latch assembly toward the latching position.

19. An awning assembly according to claim 17 further comprising a handle adapted for retracting the latch assembly.

20. An awning assembly comprising:

an awning having a leading edge and a trailing edge, said trailing edge being attachable at a wall;

a support arm adapted for supporting the leading edge of the awning;

a rafter disposable between the support arm and the wall and adapted for maintaining the support arm spaced from the wall so as to maintain the awning in an extended position and being generally parallel with, not nested in, and adjacent the support arm in a stowed position;

a latch assembly slidably mounted on one of the support arm and the rafter and adapted for engaging the other of the support arm and the rafter and slidable between a retracted position and a latching position engaging the other of the support arm and the rafter so as to retain the support arm and rafter in a generally parallel position; and means for biasing the latch assembly toward the latching position.

21. An awning assembly according to claim 20 further comprising a handle adapted for retracting the latch assembly.

22. An awning assembly according to claim 20 wherein the biasing means comprises a spring.

23. An awning assembly according to claim 22 further comprising a latch bracket mounted to the one of the support arm and rafter so as to retain the latch assembly thereon, said latch bracket including a stop, wherein said spring is disposed between the stop and the latch assembly.

24. An awning assembly according to claim 23 wherein the latch assembly includes a nose projecting from the one of the support arm and rafter and engaging the other of the support arm and rafter, wherein the spring is biased against the nose.

25. An awning assembly according to claim 20 wherein the latch assembly includes a nose projecting from the one of the support arm and rafter and engaging the other of the support arm and rafter, wherein the nose has a sloped surface adapted for retracting the latch assembly when the nose engages the other of the support arm and rafter.

26. An awning assembly according to claim 25 wherein the latch assembly projects laterally from the one of the support arm and rafter.

27. An awning assembly according to claim 26 wherein the rafter is pivotably and slidably mounted to the support arm and adapted for being pivotably mounted to the wall.

28. An awning assembly according to claim 27 wherein the rafter is mounted to a side of the support arm so that the rafter and support arm in the stowed position define a plane adapted to be generally parallel with the wall.

29. An awning assembly according to claim 26 wherein the support arm is adapted to be spaced from the wall in the stowed position and further comprising a pivot support having an end of the rafter pivotably attached thereto, said pivot support being adapted to be mounted at the wall and adapted to space the rafter from the wall substantially the same distance as the support arm is adapted to be spaced from the wall.

* * * * *

UNITED STATES PATENT AND TRADEMARK OFFICE
CERTIFICATE OF CORRECTION

PATENT NO. : 5,669,430
DATED : September 23, 1997
INVENTOR(S) : Malott

It is certified that error appears in the above-indentified patent and that said Letters Patent is hereby corrected as shown below:

Column 2, line 43, delete "partially extended" and insert -- stowed--.

Signed and Sealed this

Thirty-first Day of March, 1998

Attest:

BRUCE LEHMAN

Attesting Officer

Commissioner of Patents and Trademarks